United States Patent [19]

Kawabata et al.

[11] Patent Number: 5,267,059
[45] Date of Patent: Nov. 30, 1993

[54] SHEET SCANNER

[75] Inventors: Takashi Kawabata; Hiroyuki Kudose, both of Isehara; Masato Nakajima, Atsugi, all of Japan

[73] Assignee: Ricoh Company, Ltd., Tokyo, Japan

[21] Appl. No.: 666,639

[22] Filed: Mar. 8, 1991

[30] Foreign Application Priority Data

Mar. 16, 1990 [JP] Japan ................... 2-66338
Jul. 26, 1990 [JP] Japan ................. 2-198684

[51] Int. Cl.$^5$ .............................................. H04N 1/04
[52] U.S. Cl. .................... 358/498; 358/496; 358/474
[58] Field of Search ............. 358/498, 496, 494, 490, 358/488, 486, 474, 453, 448, 447; 271/258, 259, 265, 270

[56] References Cited

U.S. PATENT DOCUMENTS 5,057,942 10/1991 Kanehl et al. ............... 358/498
5,155,603 10/1992 Seok-Jae .................... 358/498

FOREIGN PATENT DOCUMENTS 58-111563 7/1983 Japan ....................... 358/498
61-27838 2/1986 Japan .
62-264134 7/1987 Japan .
63-180646 11/1988 Japan .
64-32839 3/1989 Japan .

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A sheet scanner scans a predetermined image on each feedable paper. The sheet scanner scans every line of the predetermined image in order to generate image data corresponding to the predetermined image. The predetermined image consists of a plurality of lines. The sheet scanner has only two rollers, which are first and second rollers. Each paper is fed from the first roller to the second roller. A first tangential speed of the first roller is lower than a second tangential speed of the second roller so that each paper is spaced at a regular interval from the next paper. The sheet scanner can make a line density for every line of the image data constant. The line density is defined as being scanned lines in a predetermined period divided by a tangential speed of feeding the paper at that time. Therefore, blurred scanning never occur in the sheet scanner according to the present invention.

36 Claims, 14 Drawing Sheets

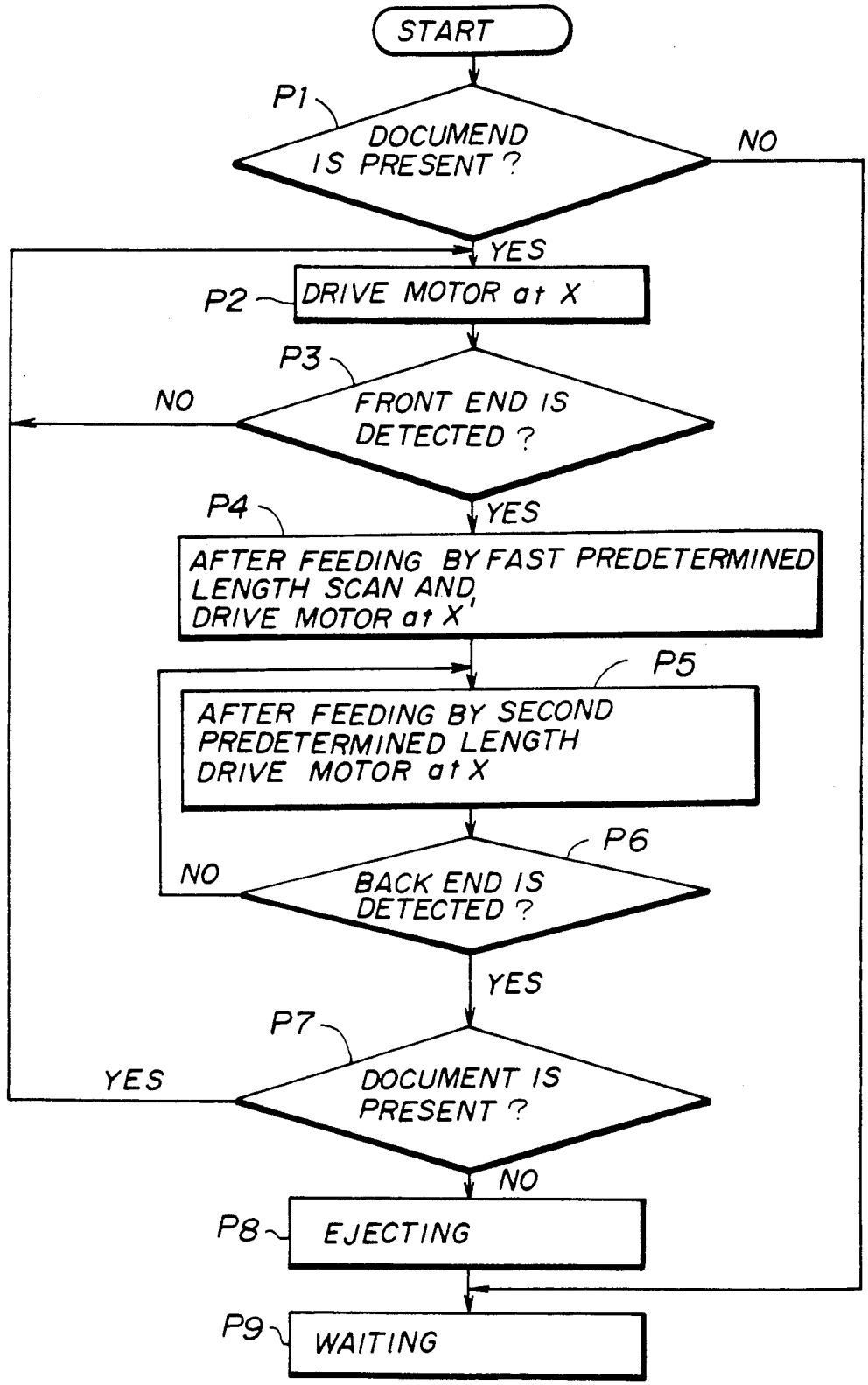

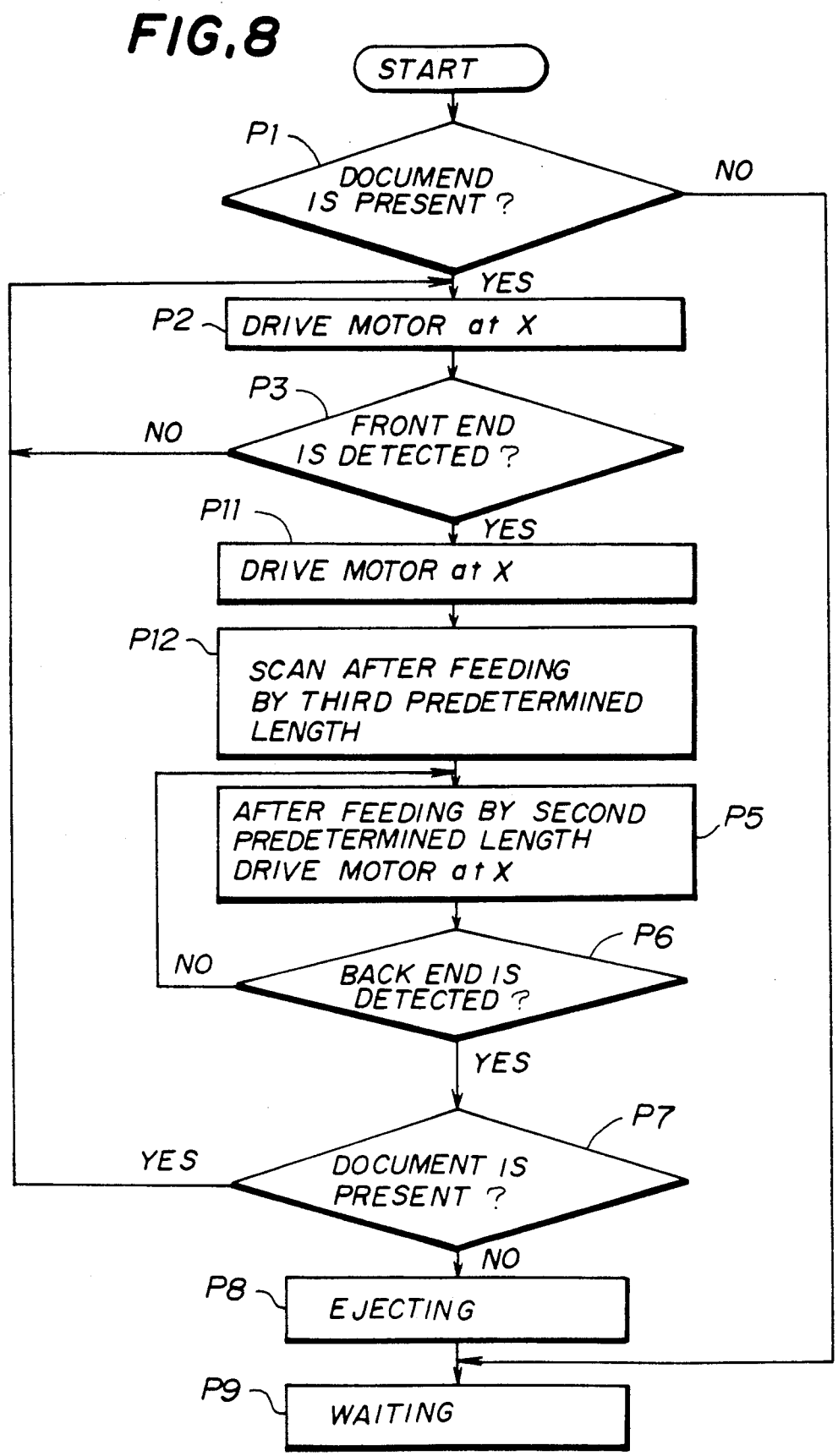

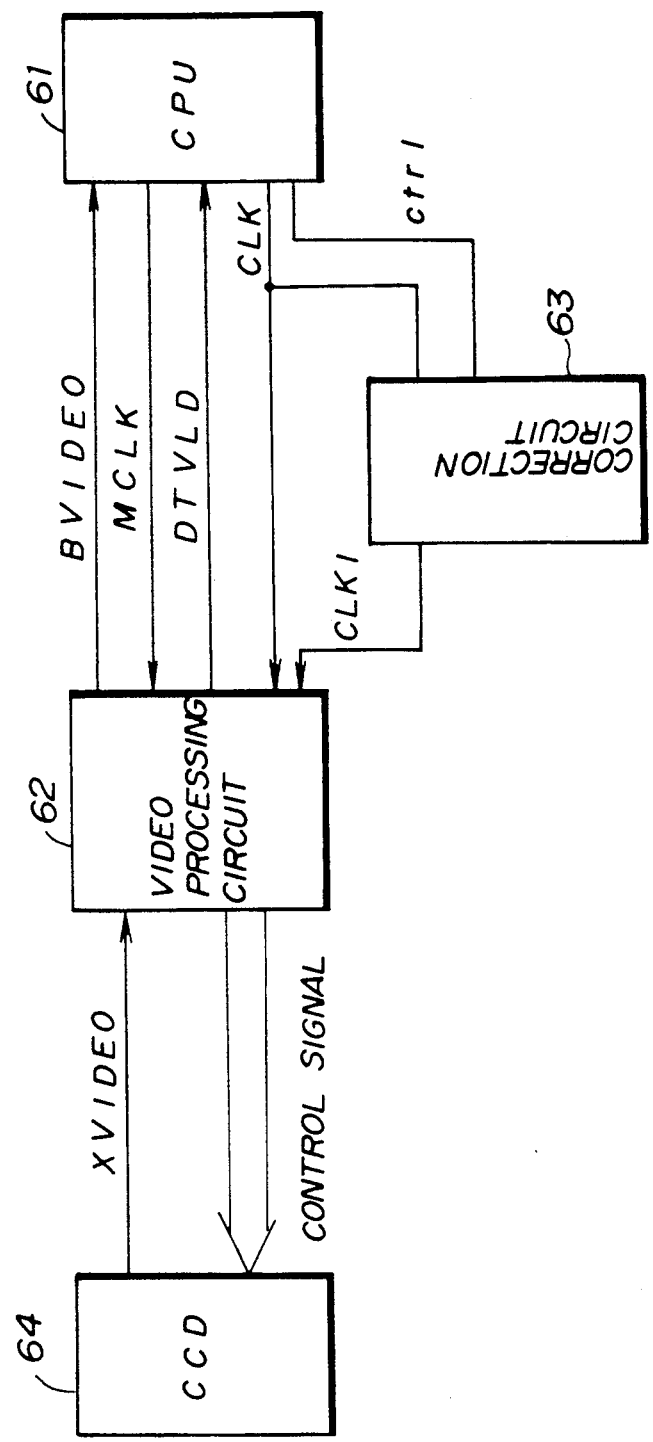

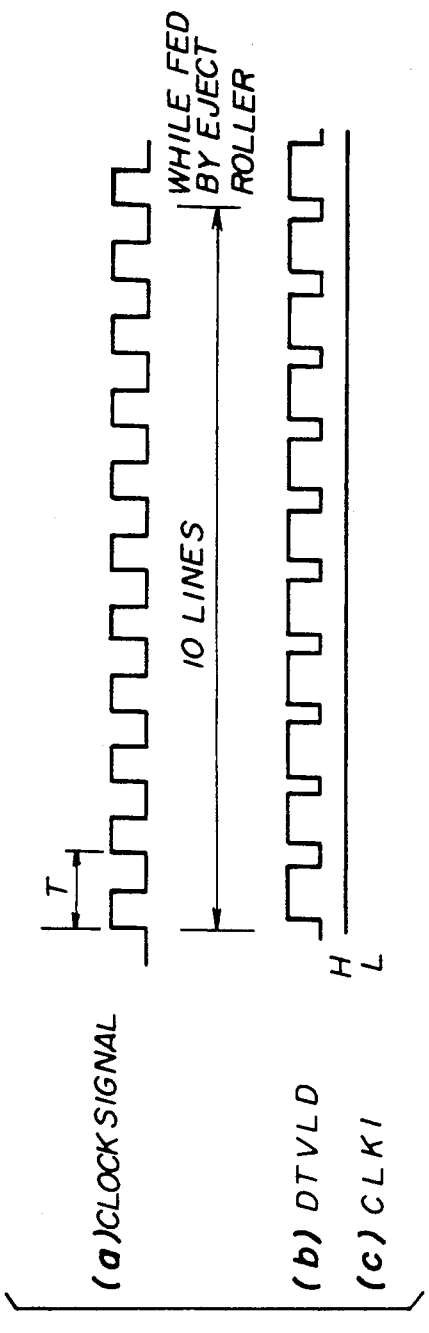
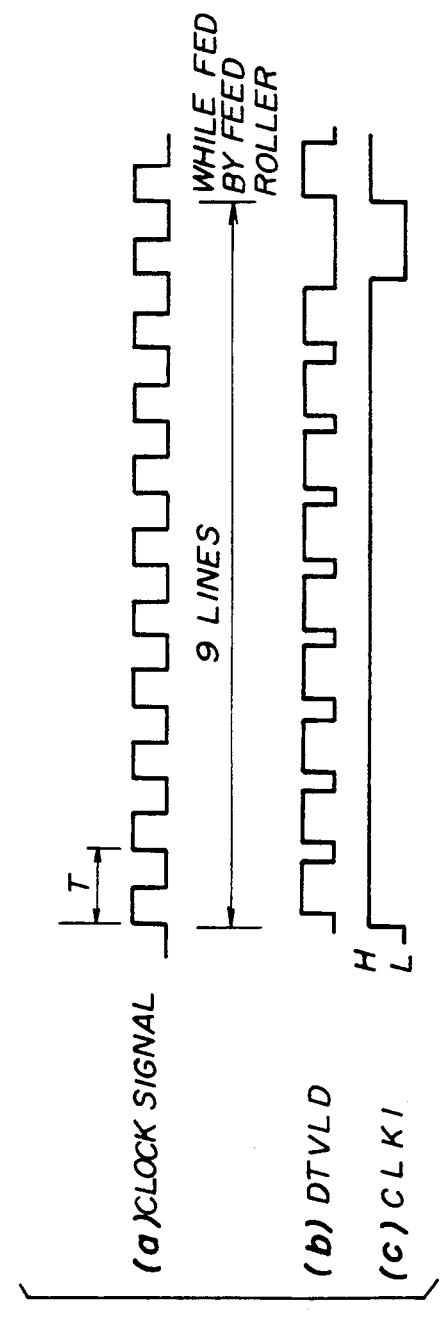

SHEET SCANNER

BACKGROUND OF THE INVENTION

The present invention relates generally to a scanner generally attached to a facsimile apparatus and a copier, and more particularly to a sheet scanner which scans an image on a feedable sheet of paper. The sheet scanner differs from a book scanner which scans an image on an unfeedable manuscript such as a book or a thick sheet of paper.

The sheet scanner scans a predetermined image on each paper of a plurality thereof fed one by one. One type of conventional sheet scanner, as shown in Japanese Laid-Open Patent Applications No. 61-27838 and No. 62-264134, uses a feed roller between a separation roller and an eject roller. The separation roller is located at an entrance of a paper supply tray in which a plurality of sheets of paper are to be supplied. The eject roller is located at the entrance of a paper eject tray through which the paper is ejected from the sheet scanner. The paper is fed from the separation roller to the feed roller, and then is fed from the feed roller to the eject roller. These three rollers are located on the feed line through which the paper is fed from the paper supply tray to the paper eject tray. A scanner body which scans a predetermined image on the paper to generate the image data corresponding to the predetermined image is located at a scan line between the feed and eject rollers. The predetermined image comprises a plurality of lines, and the scanner body scans every line. Hereupon, when $V_1$ is defined as a tangential speed corresponding to the rotation speed of the separation roller, $V_2$ as that of the feed roller, and $V_3$ as that of the eject roller, the relationship, $V_1 < V_2 < V_3$, is established in the above references. Hereupon, the tangential speed corresponds to a speed of feeding the paper. Because of the above relationship, the back end of a first paper does not overlap the front end of a second paper fed subsequently to the first paper s that the papers to be fed are scanned one by one. Incidentally, each roller is always rotated.

However, because of the different tangential speed of each roller, the feeding speed changes at a border between two sections; a first section where the paper is fed by only the feed roller and a second section where the paper is fed by only the eject roller. Hereupon, it is assumed that, when the paper is nipped by the eject roller, the rotation of the feed roller does not affect the rotation of the eject roller so that the paper is fed only by the eject roller in the second section. When the front end of the paper is fed to the scan line, scanning of the predetermined image thereon by the scanner body is started. Each line of the predetermined image on the paper is scanned at a first feeding speed corresponding to the tangential speed $V_2$ until the front end thereof reaches the entrance of the eject roller. However, when the front end thereof is nipped by the eject roller, then each line of the predetermined image is scanned at a second feeding speed corresponding to the tangential speed $V_3$. Therefore, the lines in the first section of the predetermined image are scanned at a first feeding speed and those lines in the second section are scanned at a second feeding speed, so that the image to be scanned is blurred at the aforementioned border because a line density included in the image data is not kept constant. The line density is defined as being the scanned lines in a predetermined period divided by the tangential speed at which the paper is fed at that time.

Accordingly, another type of conventional sheet scanner, as shown in Japanese Laid-Open Utility Model Applications No. 63-180646 and No. 64-32839, uses a pulse motor, an oscillation circuit and a motor control circuit. The pulse motor rotates each of the rollers in accordance with the frequency generated by the oscillation circuit. The oscillation circuit generates a plurality of frequencies. In order to prevent the sudden change of the feeding (tangential) speed at the border, the motor control circuit instructs the oscillation circuit to generate a middle frequency between a first frequency corresponding to the first feeding speed and a second frequency corresponding to the second feeding speed.

Still another type of conventional sheet scanner uses an electromagnetic clutch or a solenoid so that each paper is fed at a regular interval and at the same speed from the paper supply tray to the paper eject tray. In this type of sheet scanner, the tangential speed of each roller is preset to the same speed. Incidentally, this sheet scanner further comprises a timing controller which controls the timing of the driving and the halting of the electromagnetic clutch or the solenoid.

However, the aforementioned conventional sheet scanners have the following disadvantages:

1. In the first sheet scanner, because of the three rollers, the construction thereof is complicated and thus this scanner is expensive. In addition, the scanning is blurred because of the sudden change of the feeding speed.

2. On the contrary, the second sheet scanner uses only two rollers so that the construction is simpler than that of the first sheet scanner. However, even in the second sheet scanner, the oscillation circuit and the pulse motor therein, the construction thereof is complicated and thus this scanner is also expensive. In addition, the second sheet scanner cannot completely overcome the blurred scanning because the feeding speed in the vicinity of the border still suddenly changes and the pulse motor cannot compensate for this sudden change.

3. In the third sheet scanner, due to the electromagnetic clutch or the solenoid therein, the construction thereof is complicated and thus this scanner also expensive.

SUMMARY OF THE INVENTION

Accordingly, it is a general object of the present invention to provide a novel and useful sheet scanner in which the aforementioned disadvantages are eliminated.

Another object of the present invention is to provide an inexpensive sheet scanner in which papers do not overlap each other and a predetermined image on each paper is accurately scanned.

Another more specific object of the present invention is to provide a sheet scanner which scans a predetermined image on each paper feedable along a feed line, which sheet scanner comprises scanning means, located in the vicinity of the feed line, for scanning every line of the predetermined image on each paper at a scan line in order to generate image data corresponding to the predetermined image, the predetermined image comprising a plurality of lines, a first roller, aligned along the feed line, which feeds a sheet of paper to the scan line via the feed line, a second roller, aligned along the feed line, which feeds the sheet of paper fed by the first roller in order to eject the sheet of paper via the feed line, a first tangential speed of feeding the paper being lower than a second tangential speed of feeding the paper so that a back end of a first paper does not overlap the front end of a second paper fed subsequently to the first paper and each paper is spaced at a regular interval from the next paper, the first tangential speed being a tangential speed generated based on a rotation speed of the first roller, and the second tangential speed being a tangential speed generated based on a rotation speed of the second roller, and line density control means, coupled to the scanning means, for making a line density for every line of the image data constant, the line density being defined as being scanned lines in a predetermined period divided by a tangential speed of feeding the paper at that time.

According to the present invention, because there are only two kinds of rollers therein, the sheet scanner is not more expensive than the conventional ones, and the construction thereof is not more complicated than the conventional ones. In addition, because of the line density control means, the line density of the image data is made constant for every line so that blurred scanning never occurs.

Further objects and other features of the present invention will be apparent from the following detailed description when read in conjunction with the accompanying drawings.

BRIEF DESCRIPTION OF THE DRAWINGS

FIG. 7 shows an example of a flowchart by which the control system in FIG. 2 controls the sheet scanner;

FIG. 8 shows another example of a flowchart by which the control system in FIG. 2 controls the sheet scanner;

FIG. 9 shows a block distribution diagram of a control system of a sheet scanner of a second embodiment according to the present invention;

FIGS. 10 and 11 show signals used for the control system in FIG. 9;

DESCRIPTION OF THE PREFERRED EMBODIMENTS

Figure 1:
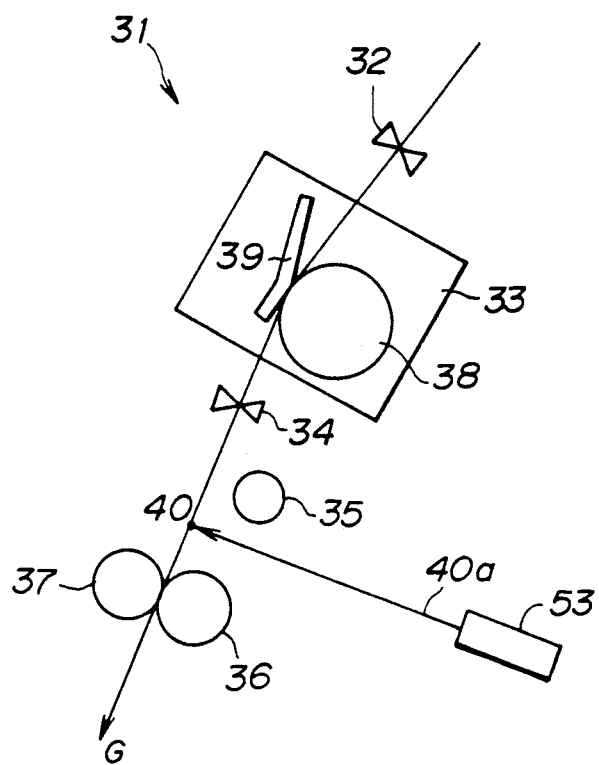
FIG. 1 shows an essential construction of a sheet scanner of a first embodiment according to the present invention.

A description will now be given of the sheet scanner of the first embodiment according to the present invention with reference to FIGS. 1 to 8. The sheet scanner 31 comprises, as shown in FIG. 1, document presence detection means 32, an auto document feeder (abbreviated ADF hereinafter) 33, document ends detection means 34, a light source 35, an eject roller 36, a pressure roller 37 coupled to the eject roller 36, and a charged-coupled device (abbreviated CCD hereinafter) 53. The document presence detection means 32, ADF 33, document ends detection means 34, eject roller 36, and pressure roller 37 are aligned along a feed line G. In addition, the CCD 53 is located in the vicinity of the feed line so that the CCD 53 scans every line of the predetermined image on each paper at a scan line 40 toward a scanning direction 40a in order to generate image data corresponding to the predetermined image. The predetermined image comprises a plurality of lines.

Papers, which correspond to documents 54, may be supplied to the sheet scanner 31 directly or via a paper supply tray (not shown) in which a plurality of sheets of paper are stored. Whether or not the paper is supplied to the sheet scanner 31 is detected by the document presence detection means 32. The document presence detection means 32 comprises an optical sensor, for example. The ADF 33 comprises a feed roller 38 and a pressure plate 39 coupled to the feed roller 38. The pressure plate 39 is partially bent to be separated from the feed line G so that the plurality of sheets of paper can be accepted at an entrance of the ADF 33. Therefore, the sheet scanner according to the present invention uses only two kinds of rollers, the eject roller 36 and the feed roller 38, so that the construction thereof is simpler than the conventional one which uses three kinds of rollers, and this sheet scanner is less expensive than the conventional one. The ADF 33 separates a plurality of sheets of paper in order to feed a sheet of paper which is in contact with the feed roller 38 to the scan line 40 along the feed line G. The feed roller 38 is driven in synchronization with the detecting of the document presence detection means 32. Since the papers are compressed by the pressure plate 39 toward the feed roller 38, only a sheet of paper which is in contact with the feed roller 38 is fed to the scan line 40 by the rotation of the feed roller 38. The document ends detection means 34, located between the ADF 33 and the scan line 40, detects front and back ends of the sheet of paper fed from the ADF 33. However, the document ends detection means 34 may be located at or in the vicinity of the scan line. The document ends detection means 34 comprises a microswitch or a photocoupler, for example. The light source 35 lights the predetermined image on the paper at the scan line 40. The CCD 53 scans by means of recognizing the predetermined image by means of reflected light generated by the light source 35. The CCD 53 scans every line of the predetermined image. The feeding speed of the scanning of each line of the predetermined image depends on tangential speeds based on rotation speeds of the feed roller 38 and eject roller 36. When the eject roller is driven, the eject roller 36 rotates with the pressure roller 37. The feed roller 38 and the eject roller 37 are driven by a motor (not shown) 52, and their respective rotation speeds are determined by the motor.

Figure 2:
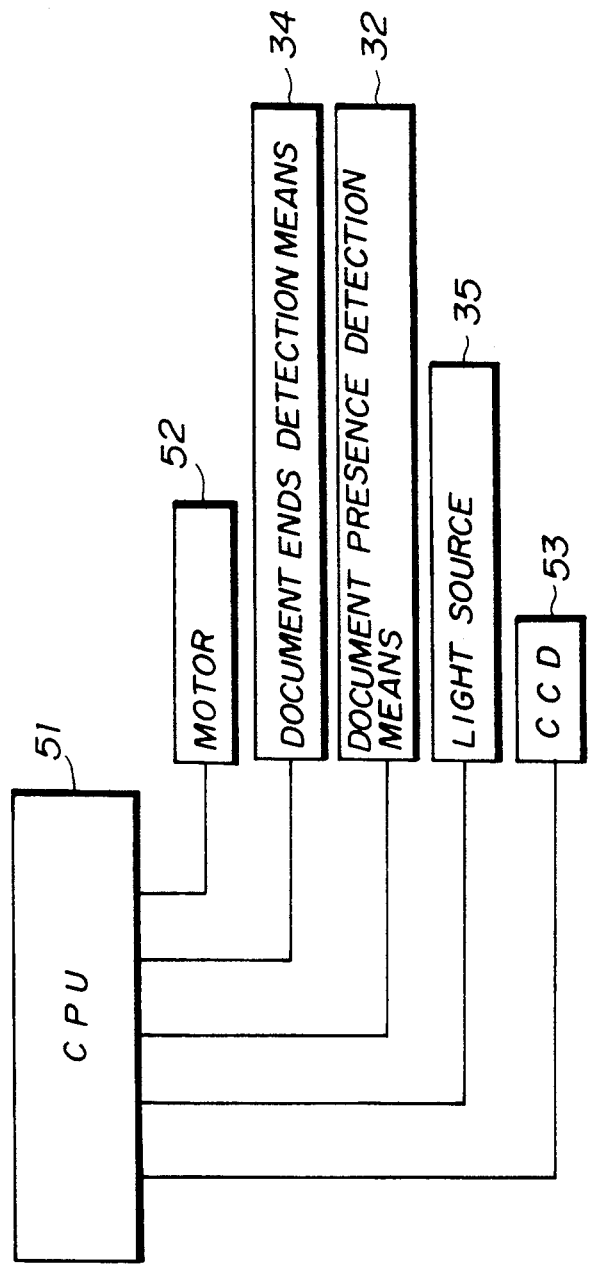
FIG. 2 shows a block distribution diagram of a control system of the sheet scanner in FIG. 1.

The sheet scanner 31 further comprises CPU 51, as shown in FIG. 2. The CPU 51 controls the driving of the motor 52, the timing of the lighting performed by the light source 35, and the transmitting of an image data generated by the CCD 53. Detection signals generated by the document presence detection means 32 and the document ends detection means 34 are respectively inputted to the CPU 51. The CPU 51 controls the motor 52, the light source 35 and the CCD 53 based on the detection signals. In addition, the CPU 51 further controls the feeding speed of the paper so that the line density for every line of the image data is maintained constant for every line.

Figure 3:
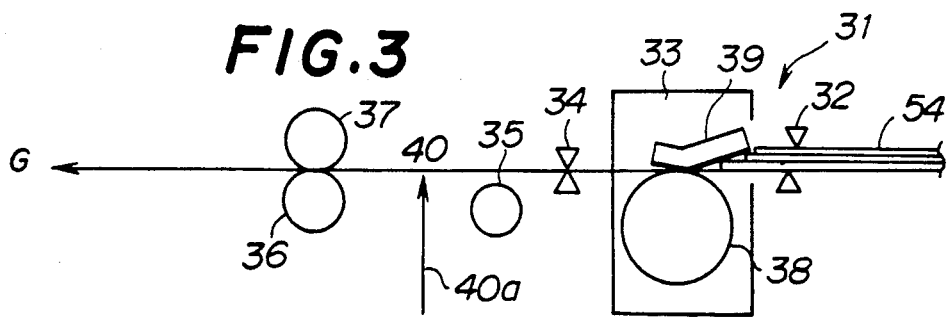
FIGS. 3 to 6 show a operation of the sheet scanner in FIG. 1.
Figure 4:
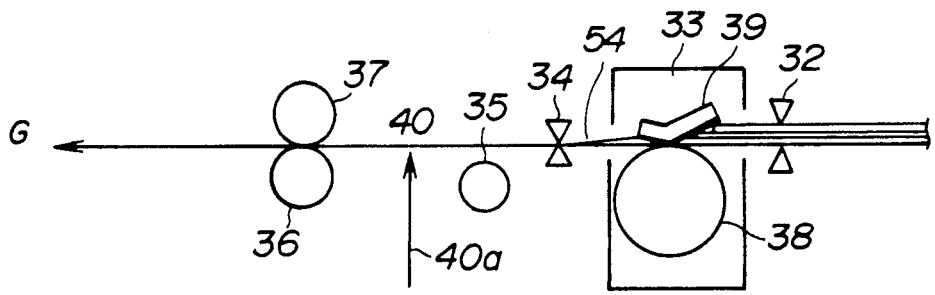
Figure 5:
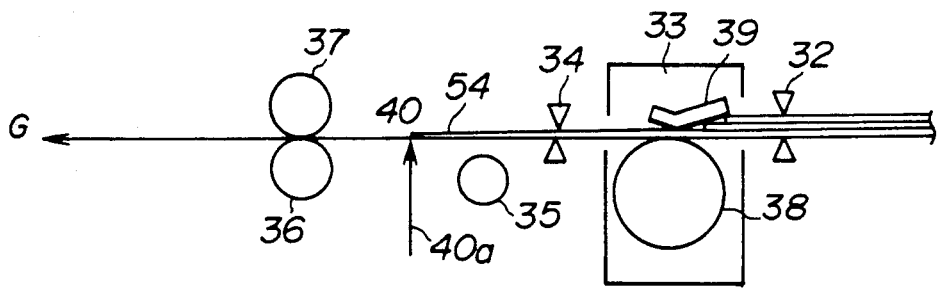
Figure 6:
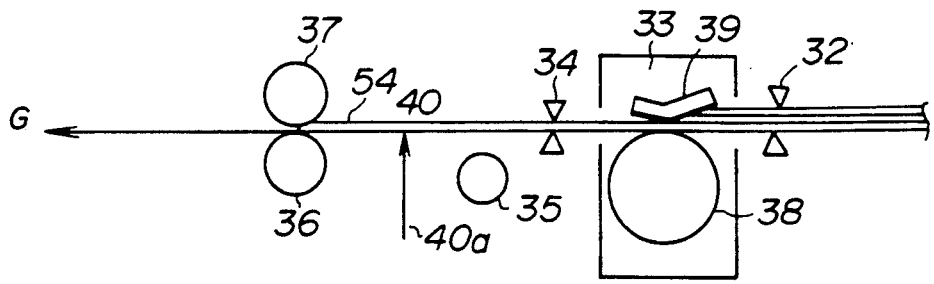

A description will now be given of the operation of the sheet scanner with reference to FIGS. 3 to 8. Hereupon, when the rotational frequency of the motor 52 becomes X, a first tangential speed based on the rotation speed of the feed roller 38 becomes A, and a second tangential speed based on the rotation speed of the eject roller 36 becomes B. Hereupon, the relationship B>A is established. When the documents 54 are supplied to the sheet scanner 31, as shown in FIG. 3, a step P1 in FIG. 7 judges whether or not the documents presence detection means 32 detects the documents 54. If the step P1 judges NO, a procedure is transferred to a step P9 so that the sheet scanner 31 waits for the documents 54. However, if the step P1 judges YES, a step P2 drives the motor 52 at the rotational frequency X so that the first and second tangential speeds become A and B, respectively. Since B>A, the tangential speed of the feed roller 38 is initially set lower than that of the eject roller 38 so that a back end of a first paper never overlap the front end of a second paper fed subsequently to the first paper and each paper is spaced at a regular interval from the next paper. Thus, a sheet of paper which is in contact with the feed roller 38 is fed to the scan line 40 along the feed line G. Subsequently, a step P3 judges whether or not the front end of the paper is detected by the document ends detection means 34, as shown in FIG. 4. If the step P3 judges NO, then the procedure is transferred to the step P2. However, if the step P3 judges YES, the paper is fed by a first predetermined length so that the front end thereof reaches the scan line 40, as shown in FIG. 5, and then a step P4 changes the rotational frequency X of the motor 52 to X' at the same time that it scans the predetermined image on the paper via the CCD 53. Hereupon, the relationship X'>X is established. As a result, the first tangential speed is changed from A to B, and the second tangential speed is changed from B to B'. Hereupon, the relationship B'>B is established. The paper is fed by a second predetermined length so that the front end of the paper reaches a nip part which is an entrance of the eject and pressure rollers 36 and 37, and then a step P5 returns the rotational frequency X' of the motor 52 to X. As a result, the first tangential speed is returned to A, and the second tangential speed is returned to B. Because of the first and second predetermined lengths, the paper is fed at the tangential speed B while the CCD 53 scans the predetermined image on the paper. Next, a step P6 judges whether or not the document ends detection means 34 detects the back end of the paper. If the step P6 judges NO, the procedure is transferred to the step P5. However, if the step P6 judges YES, a step 7 judges whether or not the document presence detection means 32 detects the documents 54. If the step 7 judges YES, the procedure is transferred to the step P2 in order to repeat the same procedure while the document presence detection means 32 detects the documents 54. However, if the step P7 judges NO, then a step P8 ejects the paper 54 via the eject roller 36, and the procedure is transferred to the step P9. Incidentally, if the step P3 judges Yes, a step P11 may change the rotational frequency X of the motor 52 to X', and a step 12 may feed the paper by a third predetermined length and then scan the predetermined image thereon, as shown in FIG. 8. Thus, as shown in FIG. 7, the paper is fed at the tangential speed B from the time that the front end thereof reaches the scan line 40. On the other hand, as shown in FIG. 8, the paper may be fed at the tangential speed B from the time that the front end thereof reaches the document ends detection means 34. In any case, the paper is fed at the tangential speed B while the CCD 53 scans the predetermined image thereon. In FIG. 8, those steps which are essentially the same as those corresponding steps in FIG. 7 are designated by the same reference numerals, and a description thereof will be omitted. The CPU 51 controls the rotational frequency of the motor 52 so that the paper is fed at the tangential speed B while the CCD 53 scans the predetermined image thereon. Since the line density of the image data generated by the CCD 53 is made constant for every line of the predetermined image, blurred scanning never occurs in the sheet scanner 31.

A description will now given of the sheet scanner of the second embodiment according to the present invention with reference to FIGS. 9 to 11. In this embodiment, since the essential construction is the same as that shown in FIG. 1, the description thereof will be omitted. This embodiment differs from the former embodiment as to the control system which makes the line density of the image data constant for every line of the predetermined image. That is, the sheet scanner of the first embodiment maintains the tangential speeds constant, based on the rotation speeds of the feed and eject rollers respectively. Therefore, blurred scanning will not occur because there is no sudden change of the feeding speed. On the contrary, the sheet scanner in the second embodiment corrects the blurred scanning by means of image processing.

As shown in FIG. 9, the control system of the sheet scanner comprises a CPU 61, a video processing circuit 62, a correction circuit 63, and a CCD 64. Each of those elements is connected to all of the other elements. The CPU 61 feeds each paper and scans the predetermined image thereon by controlling each of the elements shown in FIG. 1. In addition, the CPU 61 executes the image processing on the image data by controlling the CCD 64, the video processing circuit 62 and the correction circuit 63.

The video processing circuit 62 outputs a control signal to the CCD 62, based on a master clock signal (referred to MCLK hereinafter) and a basic clock signal (referred to as CLK) which ar inputted from the CPU 61 thereto, and a correction control signal (referred to as CLKI hereinafter) which is inputted from the correction circuit 6 thereto. Moreover, the video processing circuit 62 converts an analog image signal (referred to as XVIDEO hereinafter) from the CCD 64 into a binary image signal (referred to as BVIDEO hereinafter) and outputs it to the CPU 61. The XVIDEO represents lines scanned by the CCD 64. The CLK1 represents a section to be corrected in the XVIDEO. In addition, the video processing circuit 62 outputs a significant image data signal (referred to a DTVLD hereinafter) corresponding to the image data to the CPU 61.

The correction circuit 63 outputs the CLK1 to the video processing circuit 63, based on the CLK and a document feeding condition signal (referred to as ctrl hereinafter) inputted by the CPU 61. The ctrl represents the condition of the document fed. The correction circuit 63 outputs the CLK1 at predetermined intervals from the time that it receives the CLK and the ctrl.

A description will now be given of the operation of the control system with reference to FIGS. 10 and 11. Hereupon, it is assumed that the relationship A=0.9B is established respectively between the tangential speed A of the feed roller 38 and the tangential speed B of the eject roller 36.

Paper is fed at the tangential speed A until the front end thereof reaches the nip part of the eject roller 36 and the pressure roller 37 since the paper is fed by only the feed roller 38. On the other hand, after the front end of the paper reaches the nip part, it is fed at the tangential speed B because of the eject roller 36. As shown in FIGS. 10 and 11, the CCD 64 scans a line of the predetermined image for every period T of the CLK. Therefore, the CCD 64 scan 10 lines for periods 10T, as shown in FIG. 10(a). However, the line density in the image data in the case where the paper is fed only by the feed roller 38 is higher than that in the case where the paper is fed only by the eject roller 36 because of the relationship A=0.9B, which causes the blurred scanning. Accordingly, the correction circuit 63 erases an extra line from the image data in a case where the paper is fed only by the feed roller 38.

The correction circuit 63 calculates the CLK and inspects the ctrl. When a sheet of paper is fed only by the eject roller 36, the correction circuit 63 outputs the CLKI, which is set at a high level, to the video processing circuit 62, as shown in FIG. 10(c). In this case, the XVIDEO outputted from the CCD 64 and corresponding to all the 10 lines is binarized by the video processing circuit 62 so as to output the DTVLD, as shown in FIG. 10(b). However, when the sheet of paper is fed only by the feed roller 38, the correction circuit 63 outputs the CLK1 which is partially set at a low level to the video processing circuit 62, as shown in FIG. 11(c). The CKL1 instructs that the XVIDEO should be formed by erasing the tenth line in the XVIDEO. In this case, the DTVLD shown in FIG. 11(b) is outputted from the video processing circuit to the CPU 61. Thus, when the paper is fed by only the feed roller 38, the DTVLD having nine lines is outputted at the tangential speed A=0.9B. Therefore, the line density is made (9 lines/0.9B). On the other hand, when the paper is fed by only the eject roller 36, the DTVLD having ten lines is outputted at the tangential speed B. Therefore, the image density is made (10 lines/B). In this way, the line density in the image data is constant for all the lines so that blurred scanning never occurs in this sheet scanner.

A description will now be given of the sheet scanner of the third embodiment according to the present invention with reference to FIGS. 1 to 15. In this embodiment, the eject roller 36 in FIG. 1 is made of a transparent member in order that the document ends detection means 34 and the scan line 40 can be located in the vicinity of the nip part of the eject roller 36. Those elements which are the same as corresponding elements in FIG. 1 are designated by the same reference numerals, and a description thereof will be omitted.

Figure 12:
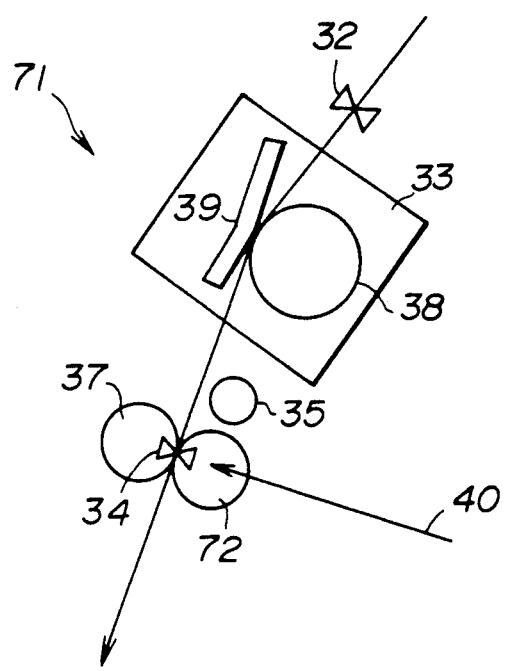
FIG 12 shows an example of an essential construction of a sheet scanner of a third embodiment according to the present invention.

In the sheet scanner 71 shown in FIG. 12, since the eject roller 72 is made of a transparent member, the document ends detection means 34 and the scanning position 40 are located in the vicinity of the nip part of the eject roller 36.

Figure 13:
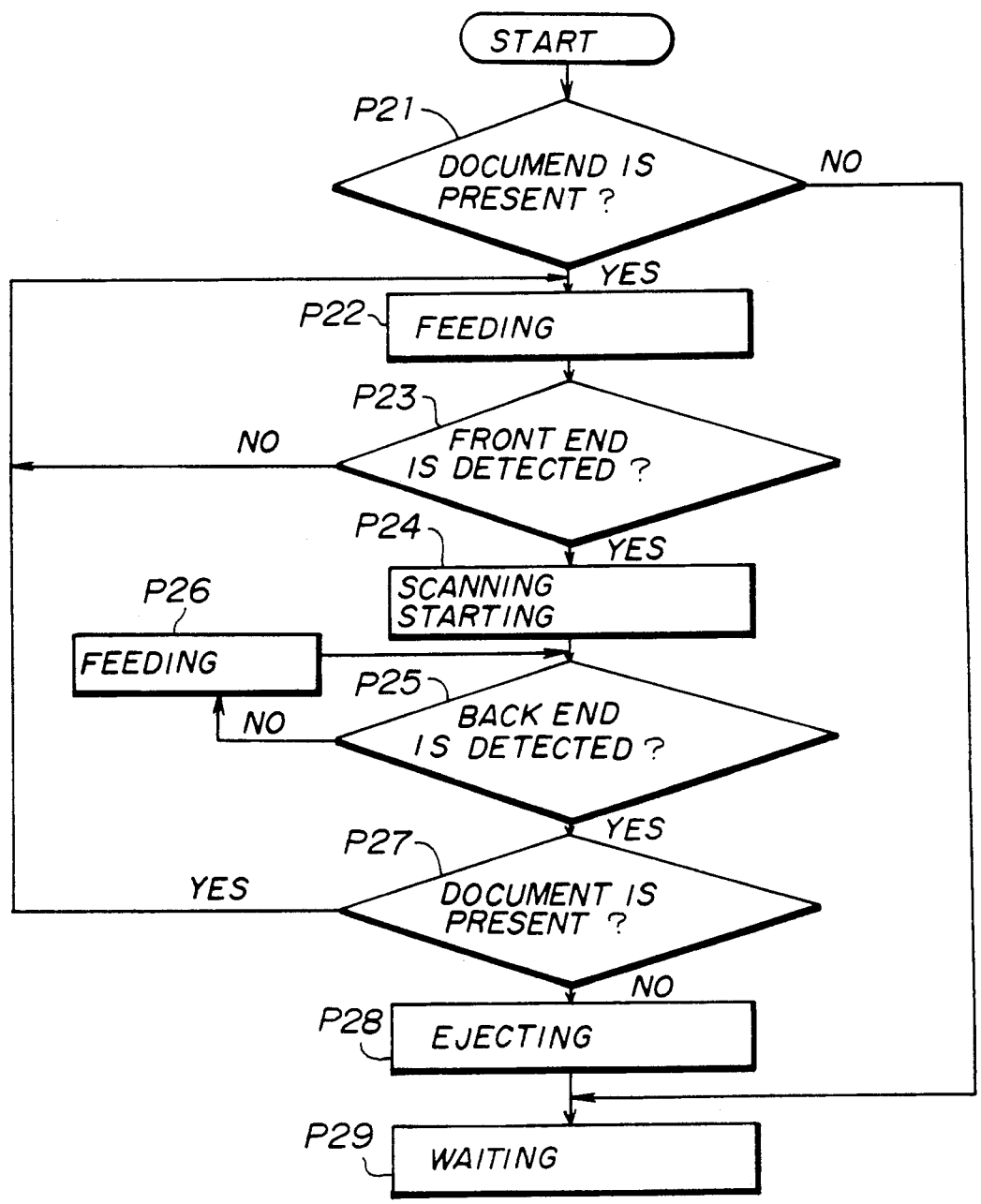
FIG. 13 shows a flowchart by which a control system controls the sheet scanner in FIG. 12.

A description will now be given of the procedure executed by the control system of the sheet scanner 71 with reference to FIG. 13. First, a step P21 judges whether or not the document presence detection means detects the documents 54. If the step P21 judges NO, the procedure is transferred to a step P29 so that the sheet scanner 71 waits for the documents 54. However, if the step P21 judges YES, a step 22 feeds the paper to the document ends detection means 34 and a step 23 judges whether or not the document ends detection means 34 detects the front end of the paper. If the step P23 judges NO, the procedure is transferred to a step P22. On the other hand, if the step P23 judges YES, a step P24 scans every line of the predetermined paper after the paper reaches the scanning position 40. Subsequently, steps P25 and P26 continue the feeding of the paper until the document ends detection means 34 detects the back end of the paper. Then, a step P27 judges whether or not the document presence detection means 32 detects other documents 54. If the step P27 judges YES, the procedure is transferred to a step P22. However, if the step P27 judges NO, a step 28 ejects the paper, and the procedure is transferred to the step P29.

Thus, the paper can be scanned just after the document ends detection means 34 detects the front end of the paper. In addition, the paper is fed only by the eject roller while it is being scanned so that the line density in the image data can be kept constant. Therefore, the sheet scanner 71 can prevent blurred scanning without using the electromagnetic clutch or the solenoid. As a result, the construction of the sheet scanner is simpler than the conventional ones and the cost thereof is kept relatively inexpensive.

Figure 14:
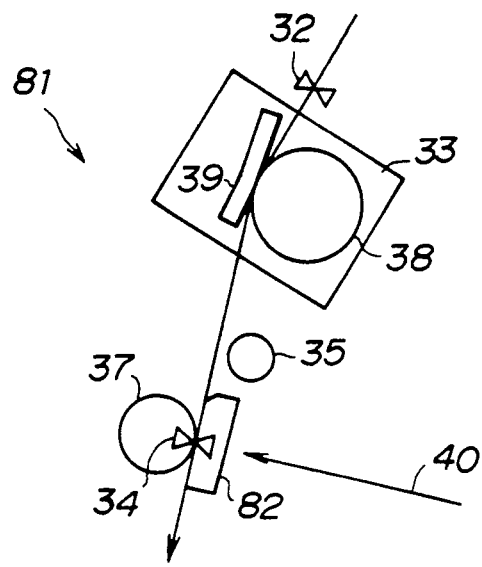
FIG. 14 shows another example of an essential construction of the sheet scanner of the third embodiment according to the present invention.
Figure 15:
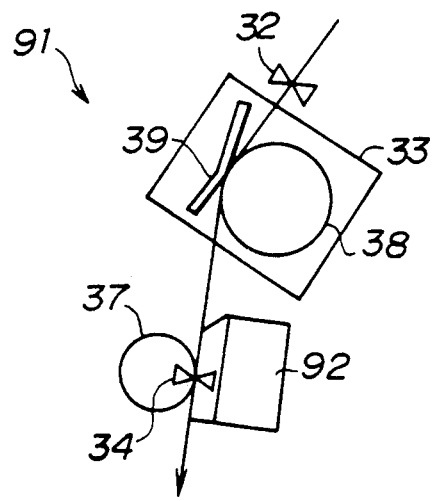
FIG. 15 shows still another example of an essential construction of the sheet scanner of the third embodiment according to the present invention.

Incidentally, the eject roller may be replaced with a contact glass. In this case, the pressure roller is driven to feed the paper. FIG. 14 shows the essential construction of the sheet scanner 81 in which such a contact glass 82 is used. Moreover, the CCD 53 may be replaced with a sensor coupled to the contact glass. The contact glass has a square pillar shape. FIG. 15 shows the essential construction of the sheet scanner 91 in which such a sensor 92 is coupled to the contact glass. The predetermined image on the paper is not enlarged or reduced when it is sensed by the sensor 92.

A description will now be given of the sheet scanner of the fourth embodiment according to the present invention with reference to FIGS. 16 to 19. Those elements which are the same as corresponding elements in FIGS. 1 and 2 are designated by the same reference numerals, and a description thereof will be omitted. This embodiment differs from the second embodiment as regards the erasing process.

Figure 16:
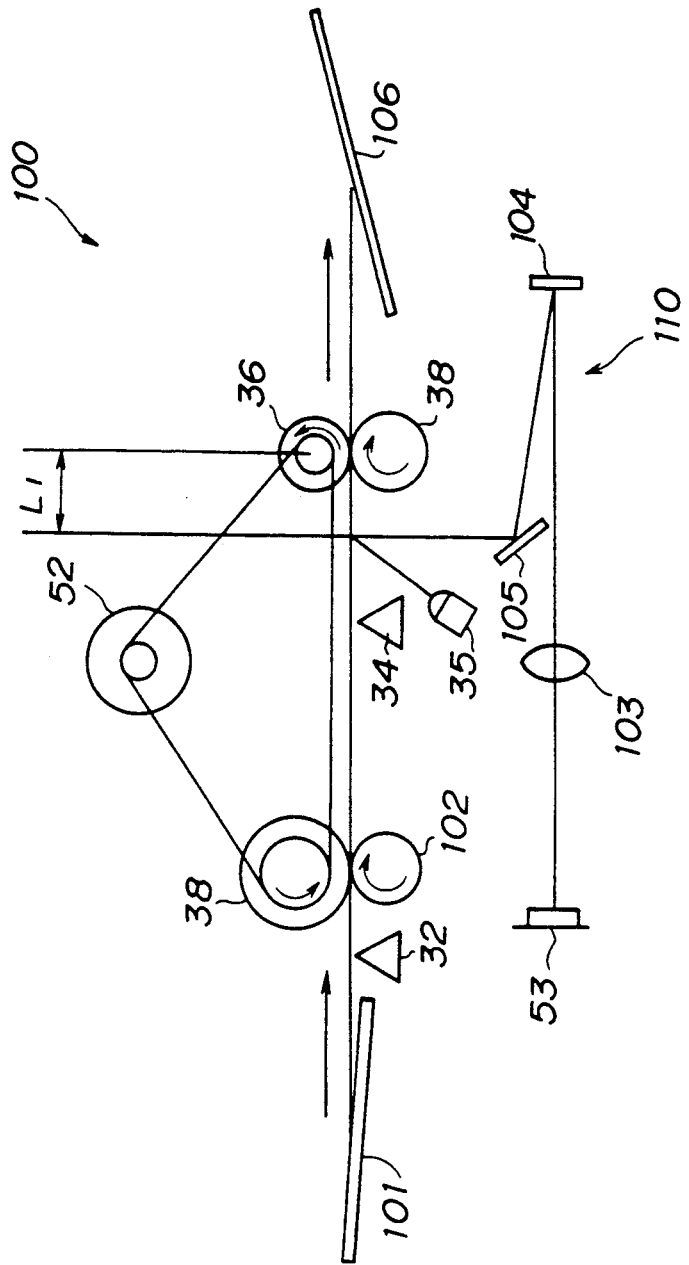
FIG. 16 shows an essential construction of a sheet scanner of a fourth embodiment according to the present invention.
Figure 17:
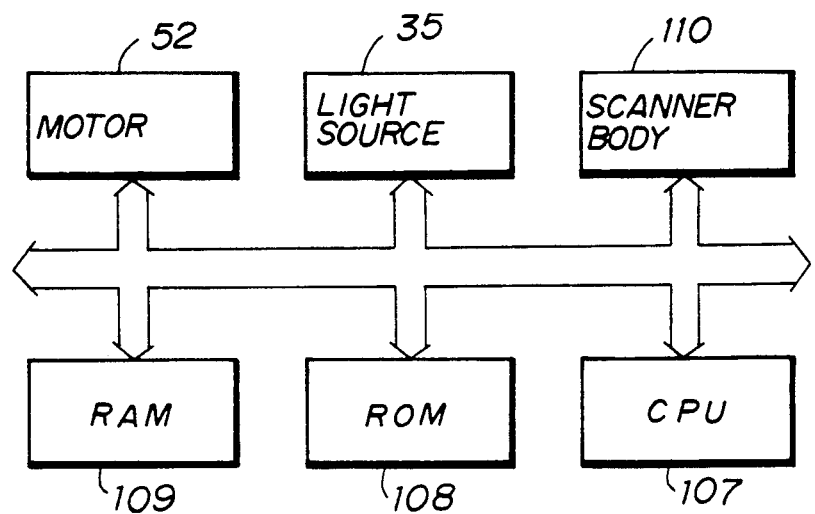
FIG. 17 shows a block distribution diagram of a control system of the sheet scanner in FIG. 16.

The sheet scanner 100 in FIG. 16 comprises a paper supply tray 100, a pressure roller 102, a lens 103, mirrors 104 and 105, and a paper eject tray 106. The paper supply tray 100 supplies the documents 54 to the feed roller 38 and pressure roller 102. The pressure roller may be replaced with a pressure plate 39. Because of the feed and pressure rollers 38 and 102, only one sheet of paper is fed to the scanning position along the feed line. The scanner body 110 comprises the CCD 53, the lens 103, the mirrors 104 and 105, and the light source 35. The sheet scanner 100 further comprises a CPU 107, a ROM 108, and a RAM 109, as shown in FIG. 17. The CPU 107 controls the driving of the motor 52, the timing of the lighting of the light source 35, and the scanning of the scanner body 110 on the basis of control programs stored in the ROM 108. Hereupon, the CPU 107 is connected to the document presence detection means 32 and the document ends detection means 34 as shown in FIG. 2. Moreover, the CPU 107 controls lines P to be erased and the erasing timing M on the basis of the detection of the changing of the feeding speeds. The lines P and the timing M are stored in the RAM 109. The CPU 107 determines the lines P by means of a counter (abbreviated CNT hereinafter) 1, and the timing M by means of a CNT 2. These CNTs 1 and 2 are stored in the RAM 109. The changing of the feeding speeds is detected by means of the document presence detection means 32 and the document ends detection means 34.

Figure 18:
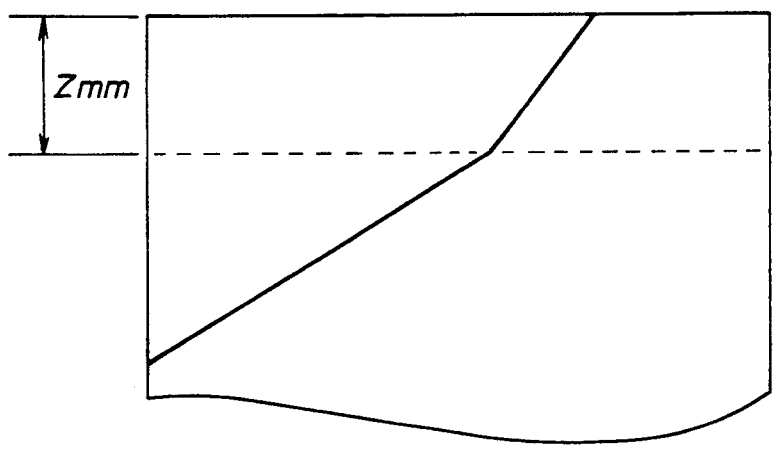
FIG. 18 shows a view for explaining an image scanned by the sheet scanner in FIG. 16.

A description will now be given of the erasing process of the sheet scanner 100. As mentioned above, when the paper is located in a section $L_1$ in FIG. 16 between the scan line and the eject roller 36, it is fed only by the feed roller 38. Therefore, as in the second embodiment, the erasing process is performed on the paper located in this section $L_1$. Hereupon, it is assumed that, when the paper is located behind the eject roller 36, the driving force of the motor 52 is not transmitted to the feed roller 38 so that the paper is fed only by the eject roller in this case. Therefore, if the lines P are not be erased, an oblique line is bent because of the changing of the feeding speed, as shown in FIG. 18. In addition, the scanner body 110 scans a line of the predetermined image in synchronization with one pulse of a driving signal transmitted from the motor 52. Moreover, the feeding speed of the feed roller 38 is defined as X mm/pulse, that of the eject roller 36 is defined as Y mm/pulse, $X<Y$, and the lines P are erased while the paper is fed by Z mm. In this case, the timing M is determined as the following equation:

$$M=(Z/X)/P \text{ (pulse/times)} \quad (1)$$

Incidentally, since Z in FIG. 18 corresponds to X, the lines P are determined by the following equation:

$$P=(Z/X)-(Z/Y) \text{ (pulse)} \quad (2)$$

Thus, the lines P and the timing M are respectively determined by the equations (1) and (2).

Figure 19:
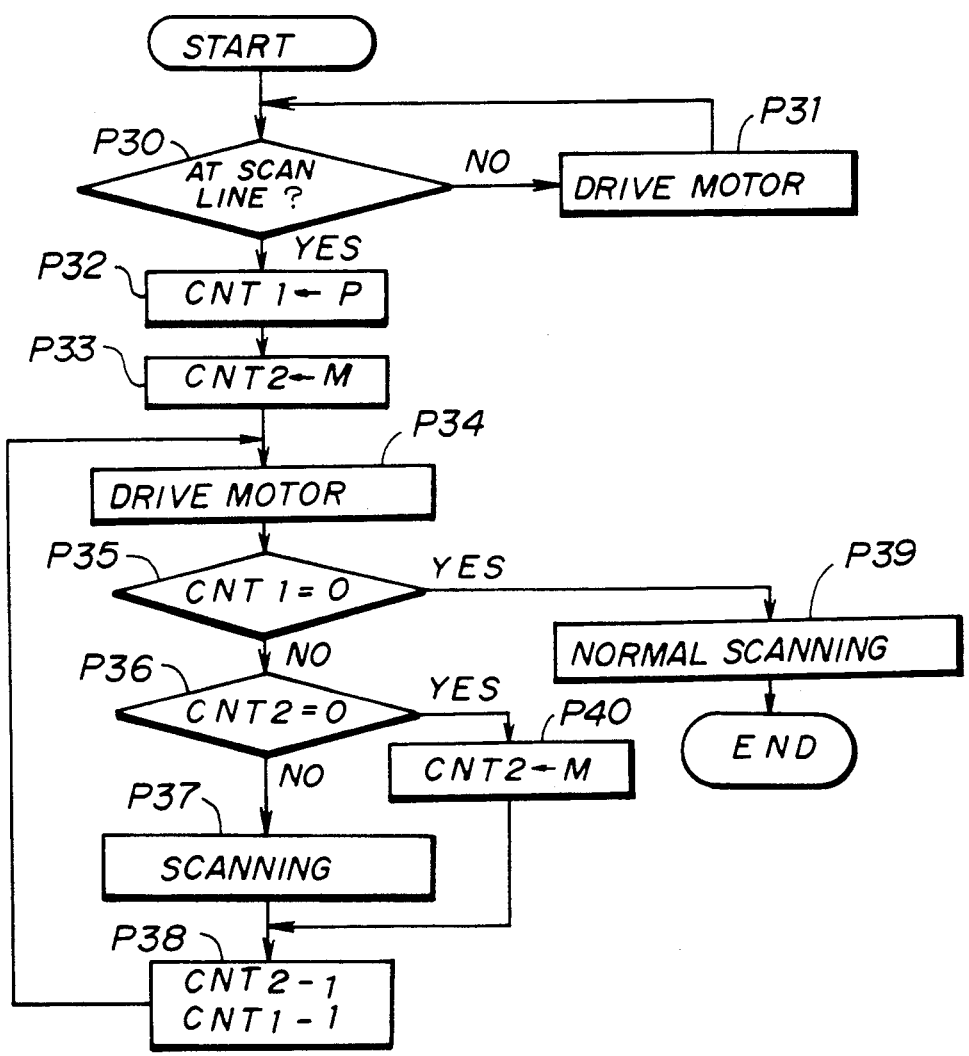
FIG. 19 shows a flowchart by which a control system controls the sheet scanner in FIG. 17.

FIG. 19 shows the flowchart of the erased process. First, a step P30 judges whether or not the front end of the paper reaches the scan line. If the step P30 judges NO, a step P31 drives the motor 52 until the front end of the paper reaches the scan line. However, if the step P30 judges YES, a step P32 sets the lines P determined by the equation (2) in the CNT 1. Subsequently, a step P33 sets the timing M determined by the equation (1) in the CNT 2. Next, a step P34 drives the motor 52, and a step P35 judges whether or not the CNT 1 is set to "0". If the step P35 judges NO, a step P36 judges whether or not the CNT 2 is set to "0". If the step P36 judges NO, a step P37 scans the predetermined image and executes the erased process with lines P and the timing M. A step 38 decreases the respective CNTs 1 and 2 by one. Then, the procedure is transferred to the step P 34. On the other hand, if the step P35 judges YES, a step P39 scans the predetermined image without erasing the lines thereof, and then the procedure is terminated. Moreover, if the step P36 judges YES, a step P40 sets the timing M determined by the equation (1), and the procedure is transferred to the step P38

Incidentally, the feeding speeds X mm/pulse and Y mm/pulse change due to the changing of the frictional forces between the feed roller 38 and the feed line and those between the eject roller 36 and the feed line. Accordingly, the CPU 107 can renew the lines P and the timing M on the basis of the equations (1) and (2) for a predetermined period.

Figure 20A:
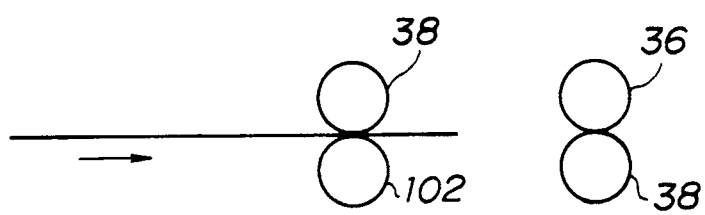
FIGS. 20A to 20C show views for explaining a sheet scanner of a fifth embodiment according to the present invention.
Figure 20B:
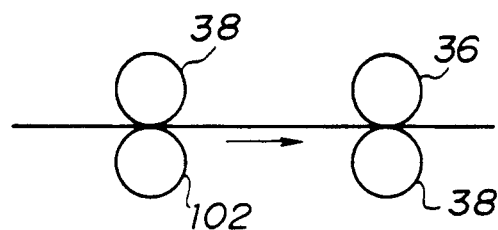
Figure 20C:
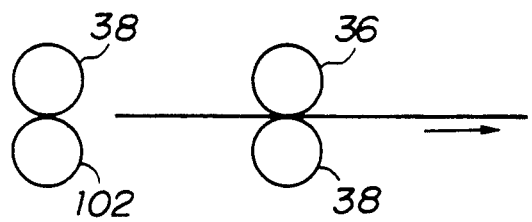

A description will now be given of the sheet scanner of the fifth embodiment according to the present invention with reference to FIGS. 20A to 20C. In the first to fourth embodiments, it is assumed that the paper is fed only by the eject roller after the paper is nipped by the eject roller. On the contrary, in this embodiment, it is assumed that the feeding speed changes at two borders between three sections because of the different tangential speed of each roller. The three sections comprises a first section shown in FIG. 20A where the paper is fed only by the feed roller 38, a second section shown in FIG. 20B where the paper is fed by the feed and eject rollers 38 and 36, and a third section shown in FIG. 20C where the paper is fed only by the eject roller 36. Therefore, two borders comprise a first border between the first and second sections, and a second border between the second and third sections. Since the tangential speed based on the rotation speed of the feed roller is equalized to that of the eject roller in the first embodiment, no border will exist in the sheet scanner 31. However, in the second to fourth embodiments, two borders would possibly exist. Whether or not the two border exist depends o the controlling of the driving of the feed and eject rollers. In any case, the above assumption according to this embodiment can be applied to the second to fourth embodiments only if the CPUs 61 and 107 adjust the line density of the image data for every section. For example, an equation corresponding to the equation (2) in a case where the paper is fed by the feed and eject rollers, as shown in FIG. 20B, is determined as follows:

$$P=(Z_1/X_1)-(Z_1/Y) \text{ (pulse)} \quad (3)$$

Hereupon, $Z_1$ is a length by which the paper is fed by the feed and eject rollers, and $X_1$ is a tangential speed in a case where the paper is fed by the feed and eject rollers.

Further, the present invention is not limited to these preferred embodiments, but various variations and modifications may be made without departing from the scope of the present invention.

What is claimed is:

1. A sheet scanner which scans a predetermined image on each paper fed along a feed line, the sheet scanner comprising:
   scanning means, located in the vicinity of the feed line, for scanning every line of the predetermined image on each paper at a scan line in order to generate image data corresponding to the predetermined image, the predetermined image comprising a plurality of lines;
   a first roller, aligned along the feed line, which feeds a sheet of paper to the scan line via the feed line;
   document ends detection means for detecting front and back ends of a sheet of paper, said document ends detection means being located between said first roller and the scan line;
   a second roller, aligned along the feed line, which feeds the sheet of paper fed by said first roller in order to eject the sheet of paper via the feed line, a first tangential speed of feeding the paper being lower than a second tangential speed of feeding the paper so that a back end of a first paper does not overlap the front end of a second paper fed subsequently to the first paper and each paper is spaced at a regular interval from the next paper, the first tangential speed being a tangential speed generated based on a rotation speed of said first roller, and the second tangential speed being a tangential speed generated based on a rotation speed of said second roller; and line density control means, coupled to said scanning means, for making a line density for every line of the image data constant, said line density being defined as being scanned lines in a predetermined period divided by a tangential speed of feeding the paper at that time, said line density control means changing an initial speed of the first tangential speed to an initial speed of the second tangential speed when the front end of the paper is detected by said document ends detection means.

2. A sheet scanner according to claim 1, wherein the first and second rotation speeds are respectively changable so that the first and second tangential speeds are accordingly changable, said line density control means changing an initial speed of the first tangential speed to an initial speed of the second tangential speed when the paper is scanned by the scanning means, and said line density control means returning the first tangential speed from the initial speed of the second tangential speed to the initial speed of the first tangential speed after the scanning of said scanning means is finished.

3. A sheet scanner according to claim 2, wherein said sheet scanner further comprises a motor, said motor driving said first and second rollers, said line density control means equalizes the first and second tangential speeds by controlling the driving of said motor.

4. A sheet scanner according to claim 3, wherein said sheet scanner further comprises document presence detection means, coupled to said line density control means, for detecting the presence of the paper, said document presence detection means being located in the front of the first roller, and said line density control means instructing said motor to drive said first and second rollers only when said document presence detection means detects the presence of the paper.

5. A sheet scanner according to claim 4, wherein said document presence detection means comprises an optical sensor.

6. A sheet scanner according to claim 1, wherein said scanning means comprises a charged-coupled device and a light source.

7. A sheet scanner according to claim 1, wherein said document ends detection means comprises a microswitch.

8. A sheet scanner according to claim 1, wherein said document ends detection means comprises a photocoupler.

9. A sheet scanner according to claim 1, wherein said line density control means is coupled to said scanning means so that said line density control means further controls the timing of the scanning of the scanning means.

10. A sheet scanner according to claim 1, wherein said sheet scanner further comprises a pressure plate coupled to said first roller, said pressure plate being partially bent to be separated from the feed line so that the plurality of sheets of paper can be accepted at an entrance of the feed roller and the pressure plate.

11. A sheet scanner according to claim 1, wherein said sheet scanner further comprises a pressure roller coupled to said second roller.

12. A sheet scanner which scanner scans a predetermined image on each paper fed along a feed line, the sheet scanner comprising:

scanning means, located in the vicinity of the feed line, for scanning every line of the predetermined image on each paper at a scan line in order to generate image data corresponding to the predetermined image, the predetermined image comprising a plurality of lines;

a first roller, aligned along the feed line, which roller feeds a sheet of paper to the scan line via the feed line;

a second roller, aligned along the feed line, which second roller feeds the sheet of paper fed by said first roller in order to eject the sheet of paper via the feed line, a first tangential speed of feeding the paper being lower than a second tangential speed of feeding the paper so that a back end of a first paper does not overlap with the front end of a second paper subsequently fed to the feed line and so that papers are spaced at regular intervals on the feed line, the first tangential speed being a tangential speed generated based on a rotation speed of said first roller, and the second tangential speed being a tangential speed generated based on a rotation speed of said second roller; and line density control means, coupled to said scanning means, for making a line density for every line of the image data constant, said line density being defined as being the number of scanned lines in a predetermined period of time divided by a tangential speed of feeding the paper at that time, wherein the first and second tangential speeds are respectively fixed at initial speeds thereof, the image data comprising first image data in a case where the paper is fed at the first tangential speed, and second image data in a case where the paper is fed at the second tangential speed, and the plurality of lines comprising first and second lines respectively included in the first and second image data, and wherein said line density control means is coupled to said scanning means, and corrects the first image data by erasing a predetermined number of scanned lines therein.

13. A sheet scanner according to claim 12, wherein said line density control means corrects the first image data by means of an image processing.

14. A sheet scanner according to claim 13, wherein said line density control means further comprises:

clock means for calculating the predetermined period;

paper feeding speed detecting means, responsive to the clock means, for detecting at what speed the paper is fed:

image processing means, responsive to the clock means and the scanning means, for executing the image processing of the image data; and correction means, responsive to the clock means and the paper feeding speed detecting means, for instructing the image processing means to correct the first image data only when the paper is fed at the first tangential speed.

15. A sheet scanner according to claim 14, wherein said clock means comprises a clock generator.

16. A sheet scanner according to claim 15, wherein said line density control means executes erases a predetermined number of scanned lines once for every first length by which the paper is fed.

17. A sheet scanner according to claim 16, wherein said line density control means determines the timing of the erasing based on the result of the first length being divided by the first tangential speed.

18. A sheet scanner according to claim 17, wherein the predetermined number of lines are determined by subtracting a second value from a first value, the first value being determined by a second length by which the paper is fed only by the first roller divided by the first tangential speed, and the second value being determined by the second length divided by the second tangential speed.

19. A sheet scanner according to claim 15, wherein said sheet scanner further comprises tangential speed changing detection means, coupled to said line density control means, for detecting the respective changing of the first and second tangential speeds, said line density control means using the detecting of the tangential speed changing detection means when said line density control means corrects the first image data.

20. A sheet scanner according to claim 19, wherein said tangential speed changing detection means comprises document ends detection means for detecting front and back ends of a sheet of paper and document presence detection means for detecting the presence of the paper.

21. A sheet scanner according to claim 12, wherein the image data further comprising third image data in a case where the paper is fed by said first and second rollers at a speed other than said first or second tangential speeds, and the plurality of lines comprising first, second and third lines respectively included in the first, second and third image data, and
    wherein said line density control means is coupled to said scanning means, and corrects the first and third image data by respectively erasing a predetermined number of scanned lines therein.

22. A sheet scanner according to claim 21, wherein said line density control means corrects the first and second image data by means of an image processing.

23. A sheet scanner according to claim 22, wherein said line density control means further comprises:
    clock means for calculating the predetermined period;
    paper feeding speed detecting means, responsive to the clock means, for detecting at what speed the paper is fed;
    image processing means, responsive to the clock means and the scanning means, for executing the image processing of the image data; and
    correction means, responsive to the clock means and the paper feeding speed detecting means, for instructing the image processing means to correct the first image data when the paper is fed only by said first roller, and for instructing the image processing means to correct the second image data when the paper is fed by said first and second rollers.

24. A sheet scanner according to claim 23, wherein said clock means comprises a clock generator.

25. A sheet scanner according to claim 22, wherein said line density control means erases a predetermined number of scanned lines once for every first length by which the paper is fed.

26. A sheet scanner according to claim 25, wherein said line density control means determines the timing of the erasing in accordance with the result of the first length being divided by the tangential speed.

27. A sheet scanner according to claim 26, wherein the predetermined number of lines concerning the first image data are determined by subtracting a second value from a first value, the first value defined as being a second length by which the paper is fed only by the first roller divided by the first tangential speed, and the second value defined as being the second length divided by the second tangential speed.

28. A sheet scanner according to claim 26, wherein the predetermined number of lines concerning the second image data are determined by subtracting a fourth value from a third value, the third value defined as being a third length by which the paper is fed by said first and second rollers divided by a third tangential speed in a case where the paper is fed by said first and second rollers, and the fourth value defined as being the third length divided by the second tangential speed.

29. A sheet scanner according to claim 22, wherein said sheet scanner further comprises tangential speed changing detection means, coupled to said line density control means, for detecting the respective changing of the first and second tangential speeds, said line density control means using the detecting of the tangential speed changing detection means when said line density control means corrects the first image data.

30. A sheet scanner according to claim 29, wherein said tangential speed changing detection means comprises document ends detection means for detecting front and back ends of a sheet of paper and document presence detection means for detecting the presence of the paper.

31. A sheet scanner which scanner scans a predetermined image on each paper fed along a feed line, the scanner comprising:
    scanning means, located in the vicinity of the feed line, for scanning every line of the predetermined image on each paper at a scan line in order to generate image data corresponding to the predetermined image, the predetermined image comprising a plurality of lines;
    a first roller, aligned along the feed line, which first roller feeds a sheet of paper to the scan line via the feed line;
    a second roller, aligned along the feed line, which second roller feeds the sheet of paper fed by said first roller in order to eject the sheet of paper via the feed line, a first tangential speed of feeding the paper being lower than a second tangential speed of feeding the paper so that a back end of a first paper does not overlap with the front end of a second paper subsequently fed to the feed line and so that papers are spaced at regular intervals on the feed line, the first tangential speed being a tangential speed generated based on a rotation speed of said first roller, and the second tangential speed being a tangential speed generated based on a rotation speed of said second roller; and
    line density control means, coupled to said scanning means, for making a line density for every line of the image data constant, said line density being defined as being the number of scanned lines in a predetermined period of time divided by a tangential speed of feeding the paper at that time, wherein said sheet scanner further comprises document ends detection means for detecting front and back ends of a sheet of paper, the location of said document ends detection means being changeable, said line density control means being coupled to said document ends detection means so that said line density control means determines a starting time of scanning performed by said scanning means when the front end of the paper is detected by said document and detection means, said second roller being made of a transparent member, and wherein said document ends detection means locates the scan line and said document ends detection means in the vicinity of said second roller, said scanning means scanning the predetermined image on the paper via said second roller.

32. A sheet scanner according to claim 31, wherein said sheet scanner further comprises a pressure roller coupled to said second roller, said document ends detection means locating the scan line and said document ends detection means at a nip part of said second and pressure rollers, the nip part thereof being an entrance thereof from which the paper is nipped by said second and pressure rollers.

33. A sheet scanner according to claim 31, wherein said sheet scanner further comprises a contact glass coupled to said second roller.

34. A sheet scanner according to claim 33, wherein said contact glass has a square pillar shape.

35. A sheet scanner according to claim 33, wherein said scanning means comprises a sensor coupled to said contact glass.

36. A sheet scanner according to claim 35, wherein the predetermined image on the paper is not enlarged and reduced when the predetermined image thereon is sensed by the sensor.

* * * * *